(12) United States Patent
Gaussin et al.

(10) Patent No.: US 8,954,237 B2
(45) Date of Patent: Feb. 10, 2015

(54) MODULAR AND SCALEABLE PORT VERHICLE

(75) Inventors: Christophe Gaussin, La Conversion (CH); Stephane Hecky, Belfort (FR); Reginald Fenix, Champey (FR)

(73) Assignee: Envision Vehicle Engineering Novasio Technology Event, Hericourt (FR)

( * ) Notice: Subject to any disclaimer, the term of this patent is extended or adjusted under 35 U.S.C. 154(b) by 143 days.

(21) Appl. No.: 13/392,664

(22) PCT Filed: Jun. 22, 2010

(86) PCT No.: PCT/FR2010/051276
§ 371 (c)(1),
(2), (4) Date: Apr. 4, 2012

(87) PCT Pub. No.: WO2011/023868
PCT Pub. Date: Mar. 3, 2011

(65) Prior Publication Data
US 2012/0197498 A1 Aug. 2, 2012

(30) Foreign Application Priority Data

Aug. 25, 2009 (FR) ..................................... 09 55797

(51) Int. Cl.
*B62D 21/12* (2006.01)
*B62D 21/20* (2006.01)
(Continued)

(52) U.S. Cl.
CPC ................ *B62D 21/12* (2013.01); *B62D 21/20* (2013.01); *B62D 33/02* (2013.01); *B62D 61/00* (2013.01); *B62D 63/025* (2013.01); *B62D 63/06* (2013.01); *B62D 65/04* (2013.01)
USPC ............................................ 701/49; 280/412

(58) Field of Classification Search
CPC ............................... B23P 11/00; B60W 40/13
USPC .............. 701/49, 124; 280/405.1, 406.2, 412, 280/800
See application file for complete search history.

(56) References Cited

U.S. PATENT DOCUMENTS 3,910,601 A * 10/1975 Michaud .................... 280/415.1
7,159,888 B1 * 1/2007 Sutton et al. ............... 280/411.1
(Continued)

FOREIGN PATENT DOCUMENTS

| DE | EP 1894 772 B1 * | 8/2007 |
|---|---|---|
| EP | 1621450 A2 | 2/2006 |
| EP | 1894772 A2 | 3/2008 |
| EP | 1621450 B1 * | 9/2008 |
| FR | 2240628 | 3/1975 |
| FR | EP 0864 485 A2 * | 5/1998 |

*Primary Examiner* — Helal A Algahaim
*Assistant Examiner* — Michael Fouche
(74) *Attorney, Agent, or Firm* — Laurence A. Greenberg; Werner H. Stemer; Ralph E. Locher

(57) ABSTRACT

The invention relates to a central module for a modular vehicle. The module is characterized in that it comprises, on either side of a loading surface, a first end having a first junction surface and a second end opposite said first end having a second junction surface that is symmetrical nonparallel to said first surface, each of the latter designed to be capable of complementarily engaging with a complementary junction surface of a side module capable of engaging with the central module by buttressing assembly. The invention relates to a modular vehicle comprising such a module. The vehicle is characterized in that the latter is assembled, at each end thereof, to a side module, one side module comprising means for running on the ground. The invention relates to a train of vehicles comprising such a vehicle.

11 Claims, 3 Drawing Sheets

(51) Int. Cl.
*B62D 33/02* (2006.01)
*B62D 61/00* (2006.01)
*B62D 63/02* (2006.01)
*B62D 63/06* (2006.01)
*B62D 65/04* (2006.01)

(56) References Cited

U.S. PATENT DOCUMENTS

2008/0017426 A1* 1/2008 Walters et al. ............... 180/65.2
2012/0181781 A1* 7/2012 Gaussin et al. ............... 280/800

* cited by examiner

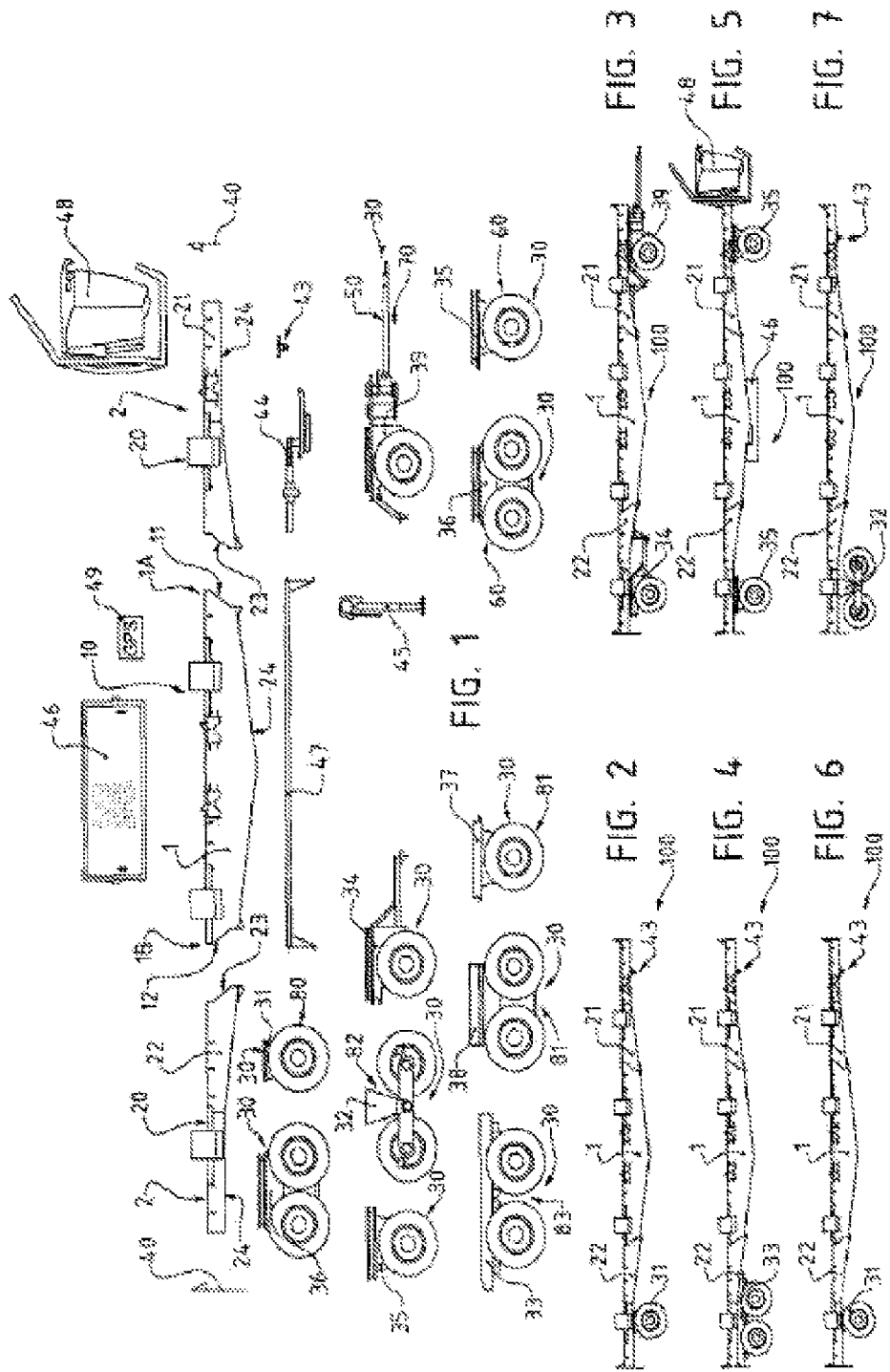

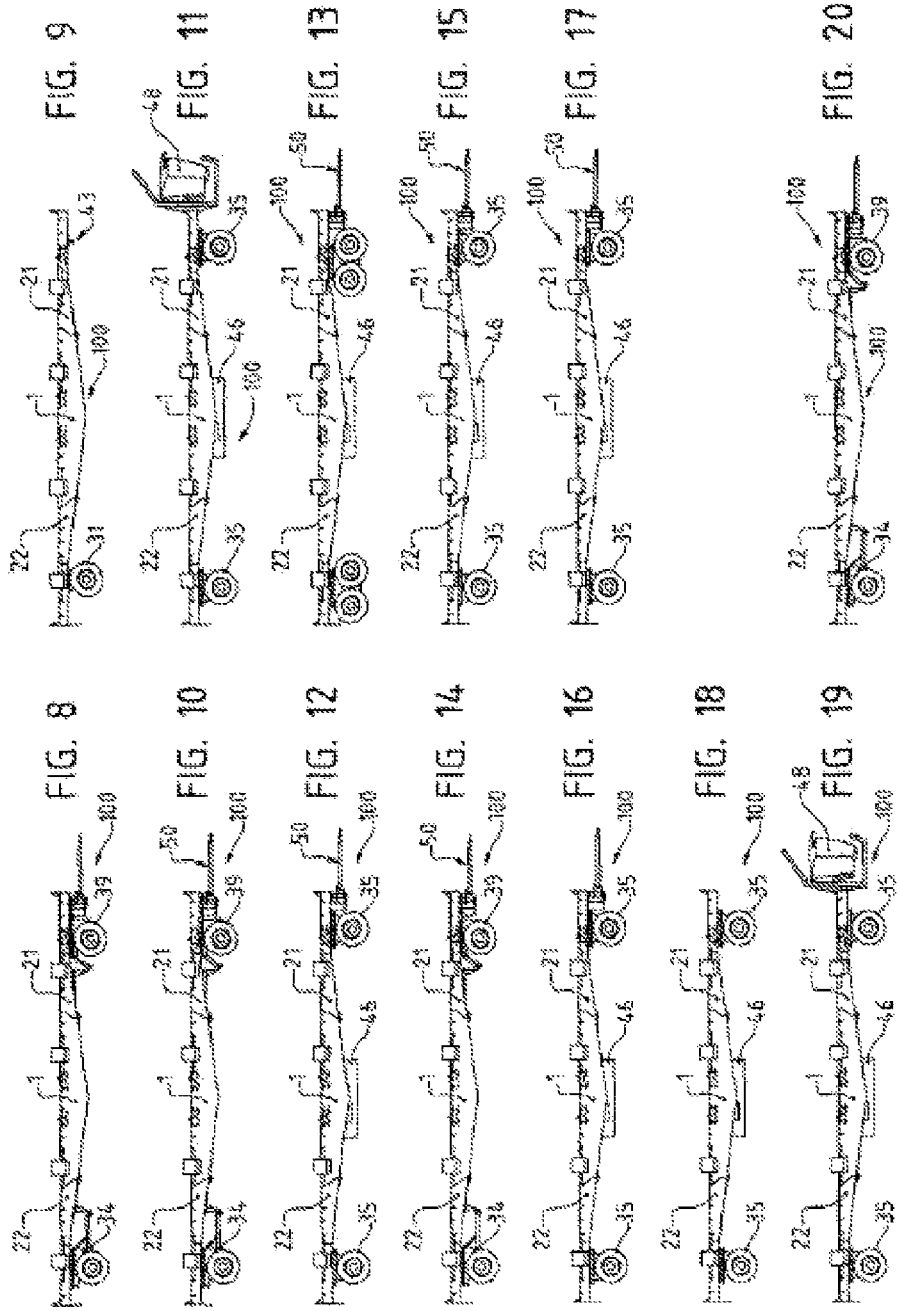

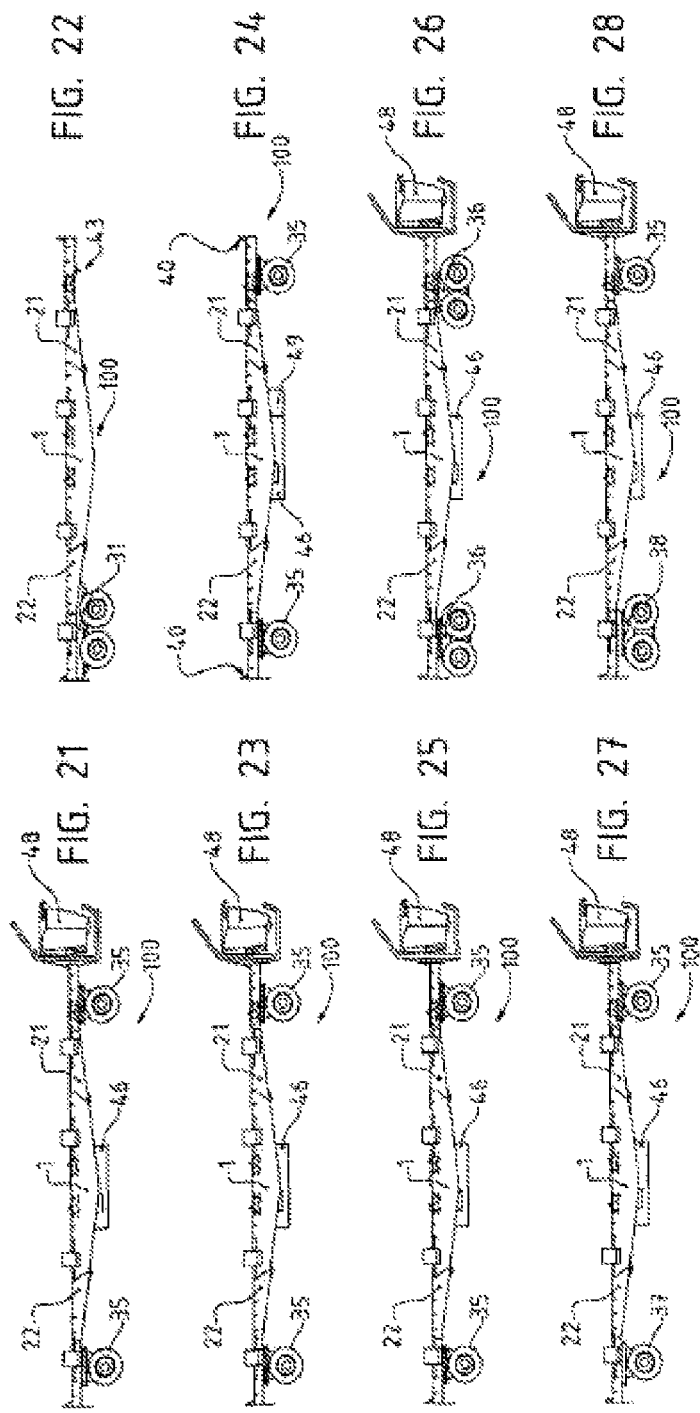

US 8,954,237 B2

MODULAR AND SCALEABLE PORT VERHICLE

BACKGROUND OF THE INVENTION

1. Field of the Invention

The invention relates to a suspended central module for a modular and scalable vehicle for transporting a load consisting of at least one standardized ISO shipping container or a payload of several metric tons.

The invention also relates to a modular and scalable vehicle comprising at least one such suspended central module.

The invention also relates to a train of vehicles comprising at least one such modular and scalable vehicle.

The present invention falls within the field of heavy handling, which means payloads of several metric tons at least, notably containers, or even heavy and bulky components such as elements of ships, bridge joists, alternators, rockets or the like, at port, airport, railway, road or hybrid installations, or even at assembly sites.

Patent Applications FR 04 52208 and FR 07 56921 by the same applicant disclose heavy transport vehicle designs which, in particular, allow a tractor vehicle to be converted into a trailer, or vice versa, or alternatively which are able to incorporate, for a specific need, additional functionalities by quickly adding dedicated modules thus allowing the operator to avoid having to tie up large numbers of special facilities that are used only rather infrequently.

The problem of transporting very large sized loads, or alternatively loads of highly specialized shapes, which requires the use of suitably sized transport vehicles, often arises. There is therefore the paradox of the need to organize abnormal loads in order, unladen, to transport specialized handling means that will later be used, again in the form of an abnormal load, to transport the payload. This problem is not confined to the road-transport environment but of course affects any site where the routing of a special vehicle runs into constraints regarding its covering of the ground, its passage under fixed installations or power cables, or into traffic priorities that do not allow the highway or the area to be encumbered for lengthy periods. Naturally, the problem of storing the special vehicles is just as acute, because of their volume. Quite specifically, in a port environment, the area available is accounted for and is allocated as a matter of priority to the payload and to the ships in transit.

Certain payloads that have to be carried may weigh as much as several hundred metric tons. Transport vehicles that are very generously engineered, either in terms of their carrying capacity in terms of weight, or in terms of their particular dimensions, are chronically underused and are difficult to make profitable, or even represent a prohibitively high hourly rate. Getting them onto the desired site also, most of the time, requires an excess width abnormal load which proves to be a particularly lengthy and costly exercise.

Special-purpose drive means may also be required, particularly in combinations of tractor vehicles and braking vehicles within one train of vehicles.

With a view to multifunctionality and autonomy, for example in terms of the equipment carried at a port or a dockyard, it is desirable for such tasks to be able to be assigned handling equipment that is engineered for ordinary missions, such as the transportation of containers, which have not been particularly over-engineered.

BRIEF SUMMARY OF THE INVENTION

The invention proposes to address these problems of availability and cost by making available a modular and scalable handling device which, through a careful combination of modules, can be used to make up on request the vehicle or vehicles suited to each handling operation. It thus offers the advantage of allowing the use, for special-purpose loads of very high tonnage or particular dimensions, to use modules designed for ordinary applications of lower tonnage, and in particular for the carriage of standard-sized ISO shipping containers notably NF ISO 668 containers. The most commonplace of these containers have a length of 20, 30, 40, 45 feet, from the known standard lengths of 8, 10, 15, 20, 30, 40, 45, 48, 50, 53 or even 60 feet. The volume of a 20-foot container is used nowadays as a comparative unit of measurement, known as TEU or 20-foot equivalent unit. The loads that correspond to such containers can be very high, for example of the order of 70 metric tons when carrying two 20-foot containers twinned in line, the standard NF ISO 668 specifying exactly the maximum tonnage of 34800 kg for a 20-foot container.

To this end, the invention relates to a suspended central module for a modular and scalable vehicle for transporting a load consisting of at least one standardized ISO shipping container or a payload of several metric tons, characterized in that it comprises, on each side of at least one loading surface designed to be able to support and hold said load, a first end comprising a first end joining surface, and a second end opposite said first end and comprising a second end joining surface which is symmetric with and not parallel to said first end joining surface, said first end joining surface and said second end joining surface each being designed to be able to collaborate in a complementary way with a complementary joining surface comprised by a lateral module designed to be able to collaborate with said suspended central module in a buttressed assembly.

The invention also relates to a modular and scalable vehicle comprising at least one such suspended central module, characterized in that the latter is assembled, at said first end to a first such lateral module, and at said second end to a second such lateral module, and in that at least said first or second lateral module is assembled with means for running along the ground.

The invention also relates to a train of vehicles comprising at least one such modular and scalable vehicle.

Further features and advantages of the invention will become apparent from the detailed description which follows of the nonlimiting embodiments of the invention given with reference to the attached drawings in which:

BRIEF DESCRIPTION OF THE SEVERAL VIEWS OF THE DRAWING

FIG. 1 is a schematic elevation of panoply of modules designed to be able to be combined in order to make up a modular and scalable vehicle according to the invention;

FIGS. 2 to 28 are schematic elevations of various vehicles obtained by combining such modules, the make-up of which will be explained in greater detail later on in the description.

DESCRIPTION OF THE INVENTION

The invention relates to the field of the handling of heavy loads, particularly handling in a port environment, and especially the handling of standardized ISO containers.

The invention relates to a modular mode of constructing one or more modular and scalable vehicles 100, which have the common feature of being produced by combining several modules around a suspended central module 1. Such a modular and scalable vehicle 100 is designed for transporting a load either consisting of at least one standardized shipping container, notably a container in accordance with the standard NF ISO 668, or a payload of several metric tons.

According to the invention, this suspended central module 1 comprises at least one loading surface 10 designed to be able to support and hold the load. The central module 1 comprises, on each side of this loading surface 10, a first end 1A comprising a first end joining surface 11 and a second end 1B opposite said first end 1A and comprising a second end joining surface 12 which is symmetric with but not parallel to the first end joining surface 11. The first end joining surface 11 and the second end joining surface 12 are each designed to be able to collaborate in a complementary way with a complementary joining surface 23 comprised by a lateral module 2 designed to be able to collaborate with the suspended central module 1 in a buttressed assembly.

According to the invention, the modular and scalable vehicle 100 comprises at least one suspended central module 1 which is assembled, at the first end 1A, to a first such lateral module 2 and at the second end 1B to a second such lateral module 2. In addition, at least the first or the second lateral module 2 is assembled with means 30 for running along the ground.

These means for running along the ground are attached to a lower bearing surface 24 that each lateral module 2 comprises and that the central module 1 may also comprise.

In some of the nonlimiting embodiments of the invention, as may be seen in FIGS. 2 to 28, at least the first or the second lateral module 2 is a front module 21 which is designed to be able to carry a kingpin 43 and/or a drawbar 50, particularly in the combinations depicted in FIGS. 2, 4, 6, 7, 9 and 22 which represent a front module thus equipped. This front module 21 is also able, in certain versions of the vehicle 100, to carry means 30 for running along the ground, with which means it is assembled, and adopts this configuration notably in FIGS. 3, 5, 8, 10, 11, 12, 13, 14, 15, 16, 17, 18, 19, 20, 21, 2, 24, 25, 26, 27 and 28.

In general, a kit of nuts and bolts is used to hold the various components together after they have been positioned relative to one another, in order to assemble them prior to use. For preference, the drilled and tapped holes made in the various modules are standardized, as are the bolts and other assembling elements used. The design of the various elements is such as to allow them to be handled and assembled using simple forklift trucks, without the need to mobilize a traveling hoist or a crane. In one particular embodiment, the central module 1 and the lateral module 2 comprise features which have not been depicted in the figures, such as housings or purchases situated symmetrically with respect to their center of gravity, to allow the passage of the forks of forklift trucks, or to allow slinging. These features are arranged on both sides of the modules and preferably go all the way through, which means to say they are preferably produced over the entire width of the modules, the width being understood as being the direction orthogonal to the length in which direction these modules are preferably assembled with one another. Naturally, these modules could alternatively, for certain applications for bulky and/or heavy loads, be designed to be juxtaposed side by side, in which case they then have mutually complementary bearing surfaces and assembly means.

In the embodiments depicted in FIGS. 2 to 28, which do not limit the invention, at least the first or the second lateral module 2, preferably the latter, is a rear module 22 assembled with means 30 for running along the ground.

In certain embodiments, the front module 21 is assembled with means 30 for running along the ground, which means comprise at least one steered driven axle system 60, as visible in FIGS. 5, 11, 18, 19, 21, 23, 24, 25, 26, 27, 28. This steered driven axle system 60 may comprise a single axle 35 or several axles, like the model corresponding to FIG. 26, which is equipped with a double-axle steered driven axle system 36.

In certain embodiments, visible in FIGS. 3, 8, 10, 12, 13, 14, 15, 16, 17, 20, the front module 21 is assembled with means 30 for running along the ground, which means comprise at least one drawbar tag axle system 70. This drawbar tag axle system 70 may have a single axle 39 or several axles, like the model corresponding to FIG. 13, which is equipped with a double-axle tag axle system. The drawbar tag axle system 70 may, alternatively still, also be driven, as in the case of the models of FIGS. 12, 13 and 15. It comprises at least one drawbar 50 for coupling to another vehicle.

Coupling may also be performed using a kingpin 44.

In certain embodiments, the rear module 22 is assembled with means 30 for running along the ground, which means comprise at least one steered driven axle system 60.

In certain embodiments visible in FIGS. 3, 8, 10, 14, 20, the rear module 22 is assembled with means 30 for running along the ground, which means comprise at least one drawbar tag axle system 70. The latter is preferably articulated, by a rudder bar linkage, via an axle transmission 47 produced in particular in the form of a connecting bar connecting rudder bars, to a steered means that the front module 21 then comprises, either in the form of steered means specific thereto, such as a steered driven axle system 60, or in the form of another tag axle system 70. This drawbar rear tag axle system may notably be a simple "multitrailer system" or "MTS" tag axle 34. For preference, it is combined with a front tag axle 39 or even with a single 35 or double 36 steered front axle, via the axle transmission bar 47.

The axle transmission 47, for the mode of steering the tag axles, may also be produced by using means other than a connecting bar. Thus each module may advantageously be equipped with a control and/or receiver element of a servo control system, notably an electro-hydraulic servo control system, or of an electrically controlled servo mechanism servo control system or similar. Each module thus equipped is then advantageously equipped with means of coupling to means of supplying energy, or is equipped with its own energy storage means, such as an electric battery, a hydraulic or a pneumatic accumulator. These specific energy storage means themselves comprise means of coupling to means of supplying energy, carried on board the module itself or on an adjacent module or alternatively external to the vehicle formed of the combination of the modules.

It will be appreciated that, more generally, any module according to the invention can thus be equipped with such means of coupling to means of supplying energy and/or with such energy storage means for powering specific equipment.

In certain particular embodiments, the rear module 22 is assembled with means 30 for running along the ground, which means comprise at least one fixed axle system 80 visible in FIGS. 2, 6, 9, 27, 28. This fixed axle system 80 may consist of a single fixed axle 31 or of a multiple fixed axle which has not been depicted in the figures. The fixed axle system 80 may, alternatively still, be formed of a fixed driven axle system 81; it may then comprise a single fixed driven axle 37 or a double fixed driven axle 38, or a multiple fixed driven axle which has not been depicted in the figures.

In certain particular embodiments, as visible in FIG. 7, the rear module 22 is assembled with means 30 for running along the ground, which means comprise at least one rocker axle system 82. This is advantageously produced in the form of a double rocker half axle 32.

In certain particular embodiments, as visible in FIGS. 4 and 22, the rear module 22 is assembled with means 30 for running along the ground, which means comprise at least one suspended axle system 83. This is preferably produced in the form of a double suspended axle 33.

In certain embodiments, the rear module 22 is assembled with means 30 for running along the ground, which means comprise at least one fixed driven axle system 81, as visible in FIG. 27, of which the fixed axle system 80 is a driven fixed axle system comprising a single axle 37, or in FIG. 28 in which the fixed axle system 80 is a driven fixed axle system with a double axle 38.

In certain embodiments in which at least one of the axle systems is a driven axle system, the steered driven axle system 60 or the fixed driven axle system 81, as the case may be, is advantageously driven, via means of transmitting motive power, by at least one encased module of drive means 46. The latter is designed to be able to be carried on board by one of the modules that make up the vehicle 100 concerned, i.e. the suspended central module 1, as visible in FIGS. 5, 12, 13, 15, 16, 17, 18, 19, 21, 23, 24, 25, 26, 27, 28, or alternatively by one of the lateral modules 2. Naturally, the drive means may be spread over several of these modules: carrying drive means on a lateral module equipped with a driven axle system makes this module directly autonomous and ready for use and makes it possible instantaneously to build a self-propelled vehicle by combining it with a central module 1 and another lateral module 2 neither of which is provided with drive means.

In certain preferred embodiments, the suspended central module 1 and/or at least one of the lateral modules 2 comprises a guidance system. This system may consist of a longitudinal guide module 40 for positioning it accurately with respect to external references. In particular, the guidance system is designed for docking accurately with respect to a load, or alternatively for twinning with other vehicles, according to French Patent Application FR 08 58657 by the same applicant.

In certain embodiments, the suspended central module 1 and/or at least one of the lateral modules 2 comprises a guidance system comprising an automatic navigation system 49 for positioning it accurately with respect to external references, or consisting of such a system. This automatic navigation system 40 may notably be chosen to be of the "GPS" type.

In certain embodiments, the suspended central module 1 and/or at least one of the lateral modules 2 comprises a driver's cab 48. This cab preferably also consists of a module comprising positioning and attachment means designed to be able to collaborate with complementary positioning and attachment means that the suspended central module 1 or, for preference, one of the lateral modules 2, or even both of them, comprise(s).

Other modules still can be combined with those described above, for example a stand leg 45 for a trailer or a semitrailer.

All of the figures illustrate the flexibility of use of the invention, particularly for port applications to which these figures relate. Thus, by modifying the equipment carried:

the semitrailer with a fixed single axle 31 and a kingpin 43 in FIG. 2 can be converted into a trailer with a single "MTS" tag axle 34 and a single drawbar axle 39 according to FIG. 3;

the semitrailer with suspended double axle 33 and kingpin 43 of FIG. 4 can be converted into a self propelled vehicle with cab 48 with single steered driven axles 35 according to FIG. 5;

the semitrailer with single fixed axle 31 and kingpin 43 of FIG. 6 can be converted into the semitrailer with double rocker half axle 32 and kingpin 43 of FIG. 7;

the trailer with simple "MTS" tag axle 34 and drawbar axle 39 of FIG. 8 can be converted into a semitrailer with a single fixed axle 31 and kingpin 43 according to FIG. 9;

the trailer with single "MTS" tag axle 34 and drawbar axle 39 of FIG. 10 can be converted into a self propelled vehicle with a cab 48 and single steered driven axles 35 according to FIG. 11;

the powered trailer with single steered driven axles 35 and drawbar 50 of FIG. 12 can be converted into a trailer with a double steered driven axle 36 and a double-axle drawbar tag axle 70 according to FIG. 13;

the trailer with single "MTS" tag axle 34 and drawbar axle 39 of FIG. 14 can be converted into a powered trailer with single steered driven axles 35 according to FIG. 15;

the powered trailer with single steered driven axles 35 of FIG. 16 can be converted into a powered trailer with a single driven axle 35 and single drawbar tag axle 39 according to FIG. 17;

the powered trailer with single steered driven axles 35 of FIG. 16 can be converted into a motorized cabless trailer equipped with a guidance system, according to FIG. 18;

the self-propelled vehicle with cab 48 and single steered driven axles 35 of FIG. 19 can be converted into an unmotorized trailer with single "MTS" tag axle 34 and drawbar axle 39 according to FIG. 20;

the self-propelled vehicle with cab 48 and single steered driven axles of FIG. 21 can be converted into a semitrailer with a double suspended axle 33 and kingpin 43 according to FIG. 22;

the self-propelled vehicle with cab 48 and single steered driven axles 35 of FIG. 23 can be converted into a motorized cabless trailer with a single steered driven axles 35 with a guidance system 40 according to FIG. 24;

the self-propelled vehicle with cab 48 and single steered driven axles 35 of FIG. 25 can be converted into a self-propelled vehicle with cab 48 and double steered axles 36 according to FIG. 26;

the self-propelled vehicle with cab 48 with a single fixed driven axle 35 and a single steered driven axle 37 of FIG. 27 can be converted into a self-propelled vehicle with cab 48 with a double fixed driven axle 38 and a steered driven axle 35 according to FIG. 28.

The invention also relates to, although this has not been depicted in the figures, a train of vehicles, which means an assembly made up of several vehicles coupled to one another, not to be confused with the driven and tag axle systems mentioned earlier which are themselves constituent components of the vehicles. Such a train of vehicles comprises at least one modular and scalable vehicle 100 as described hereinabove.

The invention claimed is:

1. A modular and scalable vehicle for transporting a load of a standardized ISO shipping container or a payload of several metric tons, the vehicle comprising:

at least one suspended central module having a loading surface constructed for supporting and holding the load, said loading surface including a first end joining surface on a first side of said loading surface and a second end joining surface opposite said first end joining surface on a second side of said loading surface, said second end joining surface being symmetric with and not parallel to said first end joining surface;

a first lateral module and a second lateral module, each said lateral module having a respective complementary joining surface, said complementary joining surface of said first module being assembled with said first end joining surface, and said complementary joining surface of said second module being assembled with said second end joining surface, said first end joining surface and said second end joining surface collaborating in a complementary way with said complementary joining surfaces in a buttressed assembly, said first lateral module being a front module having a kingpin and/or a drawbar, and said second lateral module being a rear module having a device for running along the ground.

2. The vehicle according to claim 1, wherein said front module has at least one steered driven axle system for running along the ground.

3. The vehicle according to claim 2, wherein said steered driven axle system is driven by transmitting motive power from one encased drive module carried on board by said suspended central module or by one of said lateral modules.

4. The vehicle according to claim 1, wherein said front module includes at least one drawbar tag axle system.

5. The vehicle according to claim 1, wherein said device for running along the ground of said rear module includes at least one steered driven axle system.

6. The vehicle according to claim 1, wherein said device for running along the ground of said rear module includes at least one drawbar tag axle system.

7. The vehicle according to claim 1, wherein said device for running along the ground of said rear module includes at least one fixed axle system, or one rocker axle system or one suspended axle system.

8. The vehicle according to claim 1, wherein said device for running along the ground of said rear module includes at least one fixed driven axle system.

9. The vehicle according to claim 8, wherein said fixed driven axle system is driven by transmitting motive power from at least one encased drive module constructed to be carried on board by said suspended central module or by one of said lateral modules.

10. The vehicle according to claim 1, wherein said front module includes at least one drawbar tag axle system for running along the ground and said rear module includes at least one drawbar tag axle system for running along the ground, said drawbar tag axle system of said front module being articulated by one axle transmission device to said drawbar tag axle system of said rear module.

11. The vehicle according to claim 1, wherein said suspended central module and/or at least one of said lateral modules includes a driver's cab.

\* \* \* \* \*